United States Patent
Yuen et al.

[11] Patent Number: 6,059,147
[45] Date of Patent: May 9, 2000

[54] MEASURING AND DISPENSING DEVICE

[75] Inventors: Kaye Kit-Han Yuen, Alhambra, Calif.; Oliver Murphy, III, Austin, Tex.; John Joseph Mitlyng, St. Michael; Arlen Dean Jacobsma, Monticello, both of Minn.

[73] Assignee: Ecolab, Inc., St. Paul, Minn.

[21] Appl. No.: 09/250,906

[22] Filed: Feb. 16, 1999

[51] Int. Cl.[7] .................................................. G01F 11/10
[52] U.S. Cl. ........................................ 222/181.3; 222/368
[58] Field of Search .............................. 222/181.1, 181.2, 222/181.3, 368

[56] References Cited

U.S. PATENT DOCUMENTS

| | | | |
|---|---|---|---|
| 1,560,184 | 11/1925 | McLean et al. | 222/368 X |
| 1,753,278 | 4/1930 | Westberg et al. | 222/368 X |
| 1,772,377 | 8/1930 | Whittle | 222/368 X |
| 1,833,028 | 11/1931 | Lindley | 222/368 X |
| 1,969,110 | 8/1934 | Teach . | |
| 2,220,605 | 11/1940 | Kreisberg . | |
| 2,518,520 | 8/1950 | Broun | 222/368 |
| 3,065,884 | 11/1962 | Papazian | 222/368 X |
| 4,032,045 | 6/1977 | Epple | 222/368 X |
| 4,149,660 | 4/1979 | Kraus | 222/368 |
| 4,162,751 | 7/1979 | Hetland et al. | 222/368 X |
| 4,602,725 | 7/1986 | Malpas et al. . | |
| 4,624,392 | 11/1986 | Malpas et al. . | |
| 4,632,362 | 12/1986 | Lucking . | |
| 5,022,560 | 6/1991 | Campbell . | |
| 5,131,572 | 7/1992 | Spengler . | |
| 5,211,313 | 5/1993 | Lucking et al. . | |
| 5,337,775 | 8/1994 | Lane et al. . | |
| 5,395,014 | 3/1995 | Burronw . | |
| 5,431,311 | 7/1995 | Sigmon | 222/368 |
| 5,694,794 | 12/1997 | Jerg et al. | 222/368 |

Primary Examiner—Kenneth Bomberg
Attorney, Agent, or Firm—Merchant & Gould P.C.

[57] ABSTRACT

Many water based agriculture chemicals such as dairy chemicals, including teat washes and teat dips, are supplied in concentrated form in containers or bottles. The concentrated liquid is typically diluted with water at a ratio of about 1 to 5 ounces concentrate per gallon of water to form a treatment solution. The present invention involves a device that can both meter and dispense a precise amount of concentrate from a storage container for dilution purposes. The device of the present invention includes a dispenser that is connected to a container of liquid concentrate, typically a plastic bottle containing 1 to 3 gallons of the concentrate liquid, that is held by a retainer. A precise amount of liquid is obtained by rotating a handle of the dispenser from a first position to a second position, preferably about 180° to 360°. At the first position, the dispenser obtains a precise volume of the liquid in an internal male insert component and then at the second position releases the liquid via an outlet that leads to a bucket or other container for dilution.

18 Claims, 6 Drawing Sheets

MEASURING AND DISPENSING DEVICE

FIELD OF THE INVENTION

The invention relates to a device and a method for repeated, accurate dispensing of precisely metered quantities or volumes of liquid concentrate. The concentrate volume can be diluted to form an aqueous composition. In particular, the aqueous composition can be an agricultural chemical used for hygiene maintenance or mastitis control in mammals.

BACKGROUND OF THE INVENTION

As a result of traditional selective breeding methods, milk production in dairy cows far exceeds the requirements of the newborn calf. Because of udder size, position, and anatomic configuration for rapid removal of large volumes of milk, the mammary glands of dairy cows are especially prone to injury and infection. In particular, mastitis, an infection of the mammary gland, is common in milking dairy cows.

Clinically, mastitis typically produces heat, swelling, tenderness and possible deformation of the udder. Although the milk from a mastitic udder is generally safe for human consumption, a major concern is the cost to producers. Mastitis causes a decrease in the amount and quality of milk produced by the infected cow. With decreased quality, the price obtained for the milk likewise decreases. Mastitis is typically caused by bacteria which enter the teat through the teat orifice. These bacteria account for about 90 percent of all udder infections.

More than 80 species of microorganisms have been identified as causal agents, although approximately 95% of mastitis is caused by four pathogens; *Staphylococcus aureus, Streptococcus agalactiae, Streptococcus dysagalactiae,* and *Streptococcus uberis*. Mastitis causing pathogens fall into two categories, namely contagious and environmental. Contagious bacteria, such as *Streptococcus agalactiae* and *Staphylococcus aureus*, primarily colonize host tissue sites such as mammary glands, teat canals, teat skin lesions etc. and are spread from one infected cow to another during the milking process. The mastitis causing bacteria can be spread among cows by contaminated milking units or machines, by cow to cow contact, or can be transferred by milking personnel having contaminated hands. Environmental bacteria, often streptococci, enterococci and coliform organisms, are commonly present within the cow's surroundings from sources such as cow feces, soil, plant material, bedding or water, and infect by casual opportunistic contact with an animal during the inter-milking period. General housing conditions, such as stall size, ventilation, bedding material, and access to pasture are also known to have an impact on mastitis spread.

Typically after milking, a drop of milk remains on the tip of the teat, which can serve as a center for bacterial growth. Also, the teat canal is relaxed or dilated from the vacuum applied by the milking machine. The bacteria can then migrate through the teat orifice and into the internal teat cistern to cause inflammation and blockages.

Systemic and local antibiotic administration is a proven method of mastitis treatment and prevention. Intramammary administration of antibiotics during non-lactating periods, known as dry cow therapy, is an established method for mastitis prevention when a cow is not lactating. For cows that are lactating, teat dips have long been used as a preventative for mastitis. Post milking teat dipping is considered to be the single most important factor in mastitis prevention. Teat dips can function by providing a physical barrier to bacterial entry through the teat orifice. Additionally, bacteria that may be present can be killed by antibacterial ingredients of some teat dips. Typically, the procedure of applying teat dip includes filling a cup or other suitable container with the dip formulation and dipping the teat therein.

The dip formulation can be purchased either as a liquid concentrate or in ready to use form. Ready to use forms include aerosol or other spray forms. Generally, the liquid concentrated antibacterial is supplied in a 1 gallon jug or bottle. The dairy farmer must dilute the antibacterial concentrate, typically in tap water, to obtain the correct dilution prior to administering the treatment to the animals. It is important to achieve the correct level of antibacterial ingredients per unit volume. Generally, the antibacterial is diluted with water at a ratio of about 1 to 5 ounces of concentrate per gallon of water or other aqueous solution to form the treatment solution. Too concentrated of a solution may cause irritation to the skin of the animals, including dryness, cracking, and chafing, and could create additional health problems. Too weak of a solution may be ineffective for destruction of the bacteria.

To prepare the solution for use, a volume of concentrate is poured from the bottle or container and then added to a volume of diluent, typically tap water. Often the measuring and mixing methods used by the farmers are inaccurate. Typically, the concentrate is poured into a measuring cup or other device before being added to a pre-measured volume of water. However, often random amounts of concentrate are mixed with random amounts of water in proportions that result in a substantial excess or an insubstantial amount of active materials. The resulting diluted treatment solutions are often ineffective in treating or preventing mastitis or may even cause additional health problems, irritation, for the animal if used in excess. A simple method of measuring and dispensing a precise, pre-determine volume of concentrate from a container for dilution into another container is needed in this art.

Valves, taps, spigots, and many other devices for dispensing liquid from containers are well known in the art. However, the majority of these devices are not capable of dispensing a pre-determined or measured volume of liquid material. Further, these devices often drip and leak. Attempts have been made to provide devices that measure and dispense set volumes of materials; see for example, U.S. Pat. Nos. 1,969,110 to Teach; 2,220,605 to Kreisberg; 2,518,520 to Broun; and 5,694,794 to Jerg, et al.

SUMMARY OF THE INVENTION

A device for repeated measurement of liquid concentrate from a liquid concentrate storage container is provided by the invention. The device includes a stationary female member and a rotatable male member. The stationary female member includes an inlet, an outlet, an interior receiving area, and an exterior supporting surface. The inlet is constructed for attachment to an opening in a liquid concentrate storage container. The rotatable male member is provided within the receiving area of the stationary female member and provides a chamber for measurement of liquid concentrate. The rotatable male member is configured and arranged for rotation within the stationary female member between a first position and a second position. The chamber includes a wall for containing liquid concentrate within the chamber and an aperture for allowing liquid concentrate to flow into and out of the chamber. The wall and the aperture are configured to allow liquid concentrate to flow into the chamber when the rotatable male member is provided in the first position, and allow liquid concentrate to flow out of the chamber when the rotatable male member is provided in the second position. A retainer is provided for holding the stationary female member relative to the liquid concentrate storage container. The retainer includes a stationary female member holder for attachment to the exterior supporting surface of the stationary female member, and a concentrate storage container holder for holding a liquid concentrate storage container.

The rotatable male member can be configured to provide the entire chamber. Preferably, the rotatable male member and the stationary female member combine to form the chamber. In addition, the rotatable male member preferably comprises a handle for rotating the rotatable male member between the first position and the second position.

A system for repeated measurement of liquid concentrate from a liquid concentrate storage container is provided by the invention. The system includes a liquid concentrate storage container having an opening for flow of liquid concentrate therefrom, and a device for repeated measurement of liquid concentrate from the liquid concentrate storage container. The liquid concentrate storage container preferably includes a plastic bottle. A threaded cap is preferably included for attaching the inlet of the device to the opening of the liquid concentrate storage container.

A method of measuring and dispensing a liquid concentrate from a liquid concentrate storage container is provided by the invention. The method includes a step of attaching a device for repeated measurement of liquid concentrate to a liquid concentrate storage container. The method additionally includes a step of rotating the rotatable male member between a first position and a second position to provide a measured amount of liquid concentrate.

DETAILED DISCUSSION OF THE INVENTION

The present invention relates to a device for measuring and dispensing a precise volume of liquid antibacterial chemicals for dilution. The invention is intended for use in agricultural applications, in particular in applications which require dilution of a liquid concentrate to produce a solution. In a preferred embodiment, the resulting solution is used for hygiene maintenance of mammals, in particular dairy cows and other commercial milk producing animals.

Figure 1:
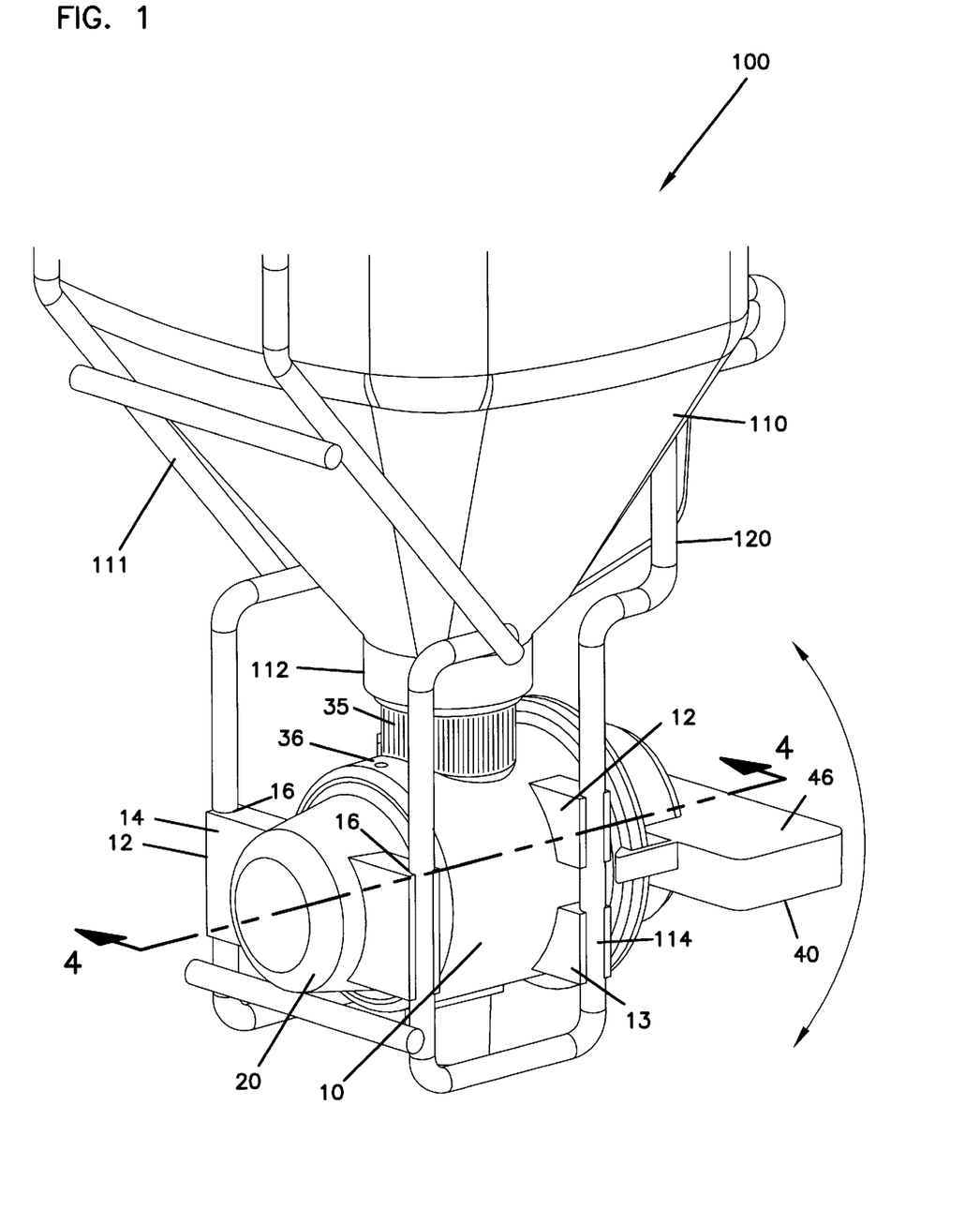
FIG. 1 is a perspective view of one embodiment of a metering and dispensing device of the present invention in conjunction with a liquid concentrate storage container, the device comprising a dispenser and a retainer.

Referring to the Figures, wherein like reference numerals represent like parts throughout the several views, FIG. 1 shows a device 100 for repeated measurement of liquid concentrate comprising a dispenser 10 and a retainer 120. Positioned within the retainer 120 is a liquid concentrate storage container 110. The device 100 is used to repeatedly measure and dispense an accurate volume of liquid concentrate from the container 110. The dispenser 10 includes a stationary female member 20 and a rotatable male member 40.

The retainer 120 includes a concentrate storage container holder 111 and a stationary member holder 114. The concentrate storage container 110 is supported by concentrate storage container holder 111, and the dispenser 10 is held by stationary member holder 114. The retainer 120 is provided to hold the concentrate storage container 110 relative to the dispenser 10. Accordingly, as the rotatable male member 40 rotates, the retainer 120 provides reinforcement for keeping the concentrate storage container 110 attached to the dispenser 10. The retainer 120 is preferably a rigid wire rack or tubular cage. The retainer 120 may be wire, wood, plastic, composite, and the like, and may be painted or otherwise covered with a coating.

It should be appreciated that the retainer 120 can be mounted to a wall or other surface. The concentrate storage container 110 and dispenser 10 can preferably be easily removed from the retainer and reinserted into the retainer. This may be appropriate when it is desirable to replace or recharge the concentrate storage container.

The container 110 is provided for storing liquid, and may be provided in the form of a bottle, jar, bag, sack, and the like. Many different sized and shaped liquid concentrate containers can be used with the device of the present invention. Preferably, the container 110 will be a one gallon plastic bottle. The concentrate storage container holder 111 preferably extends along at least a portion of the sides of container 110 to stabilize the container 110 as the rotatable male member 40 is rotated. Preferably, the concentrate storage container holder 111 extends at least half the height of the container 110. It should be appreciated that the height of the container 110 is the distance from the bottom of the container 110 to the top of the container. Preferably, the concentrate storage container holder 111 extends at least about 75% of the height of the storage container 110, and even more preferably the entire height of the storage container 110. In an alternative embodiment, the concentrate storage container holder 111 can be provided so it encloses the concentrate storage container 110.

The dispenser 10 is held in place with respect to container 110 by retainer 120. The exterior support surface 22 of dispenser 10 engages with retainer 120 to securely maintain dispenser 10 in position with respect to container 110. Exterior support surface may comprise physical mounts such as retainer mounts 12, and may function to snap, clamp, or use any other attachment system, for example, hook and loop, that can secure dispenser 10 to retainer 120. Preferably, retainer mounts 12 are formed as a part of the stationary female member 20. Preferably, the mounts 12 include forward mounts 13 and rearward mounts 14. In addition, the mounts 12 preferably include engaging surfaces 16 which engage the stationary member holder 114 of the retainer 120.

In a preferred embodiment, the engaging surface 116 is slidably attached to the stationary member holder 114 to provide for removal of the dispenser 10 from the retainer 120.

The dispenser 10 may be permanently affixed within retainer 120 or dispenser 10 may be easily removable from retainer 120. Container 110 is preferably easily removable from concentrate storage container holder 111 and retainer 120, so that empty containers can be quickly and easily removed and replaced with full containers.

Figure 2:
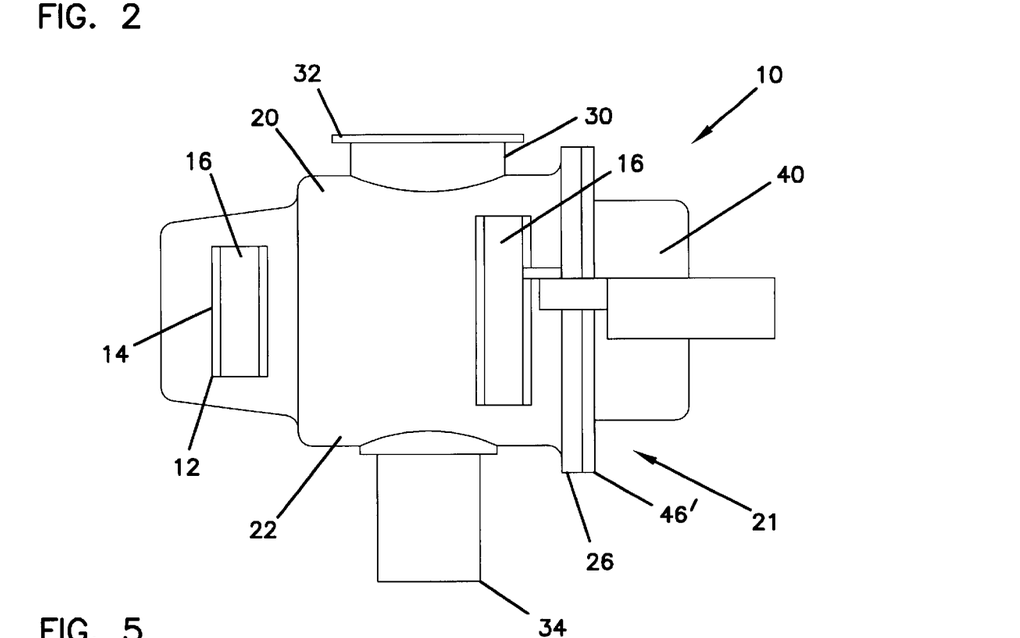
FIG. 2 is a side view of the dispenser shown in FIG. 1.

FIG. 2 shows in greater detail dispenser 10 of device 100. Dispenser 10 includes two parts, a stationary female member 20 and rotatable male member 40. It should be appreciated that the term "stationary" refers to the positioning of the female member relative to the retainer 120 and the liquid concentrate storage container 110. It is the rotatable male member 40 (shown alone in FIG. 3) which rotates within the female member 20 as shown by the arrow in FIG. 1. The stationary female member 20 includes an opening 21 into which the rotatable male member 40 can be provided.

Figure 3:
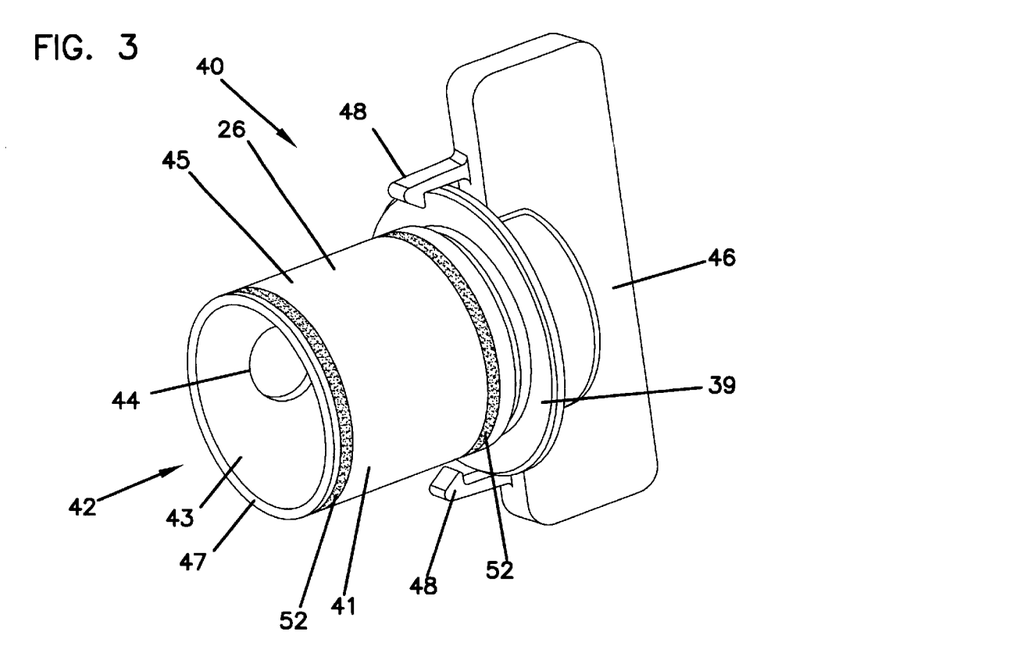
FIG. 3 is a perspective view of a rotatable male member of the device of the present invention.

Stationary female member 20 provides the outer shell of dispenser 10 and includes inlet 30, an outlet 34, an interior receiving area 24 and an exterior supporting surface 22. The stationary female member 20 additionally includes an interior surface 25 which is provided with a generally cylindrical shape for receipt and rotation therein of the extension 26 of the rotatable male member 40. As shown in FIG. 3, the extension 26 is generally cylindrical in shape corresponding to the surface 25.

Inlet 30 and outlet 34 are preferably positioned on a vertical axis in use, but may be offset along the length of stationary female member 20. Inlet 30 and outlet 34 are preferably positioned 180° from each other on stationary female member 20, but other arrangements, such as 90° positioning, can also be used. Inlet 30 and outlet 34 are shown extending from stationary female member 20.

Inlet 30 is constructed for attachment to an opening 112 in liquid concentrate storage container 110. The top of inlet 30 includes a collar 32 that helps provide a tight seal between dispenser 10 and opening 112. Liquid concentrate storage container 110 may be picked, or inlet 30 and collar 32 may be designed, so that opening 112 fits directly on top of, internal to, or external to collar 32. Collar 32, inlet 30, or both may include internal threads to allow a container such as a bottle to be screwed thereon. It may be desired to include an internally threaded cap 35 on inlet 30 that is used to tighten container 110 with opening 112 securely onto collar 32. The seal between liquid concentrate storage container 110 and dispenser 10 should be sufficient to prevent leaks, spills, and other seepage of liquid concentrate. In general, the inlet 30 can be attached to the opening 112 by providing a threaded cap 35, placing a hole in the threaded cap 35 to allow insertion of the collar 32. Preferably, the collar 32 is made of a material which is sufficiently flexible to allow it to fit within the opening provided in the cap 35.

Figure 4:
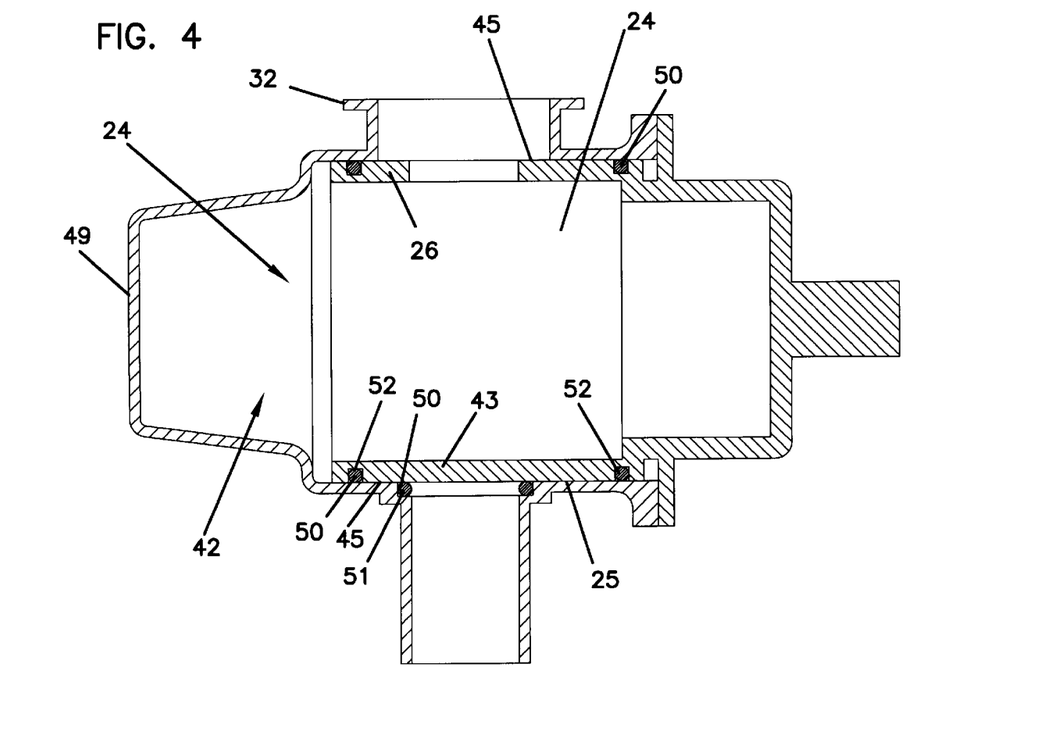
FIG. 4 is a cross-section view of the dispenser shown in FIG. 1 taken along line 4—4, with the dispenser in an accepting position.
Figure 6:
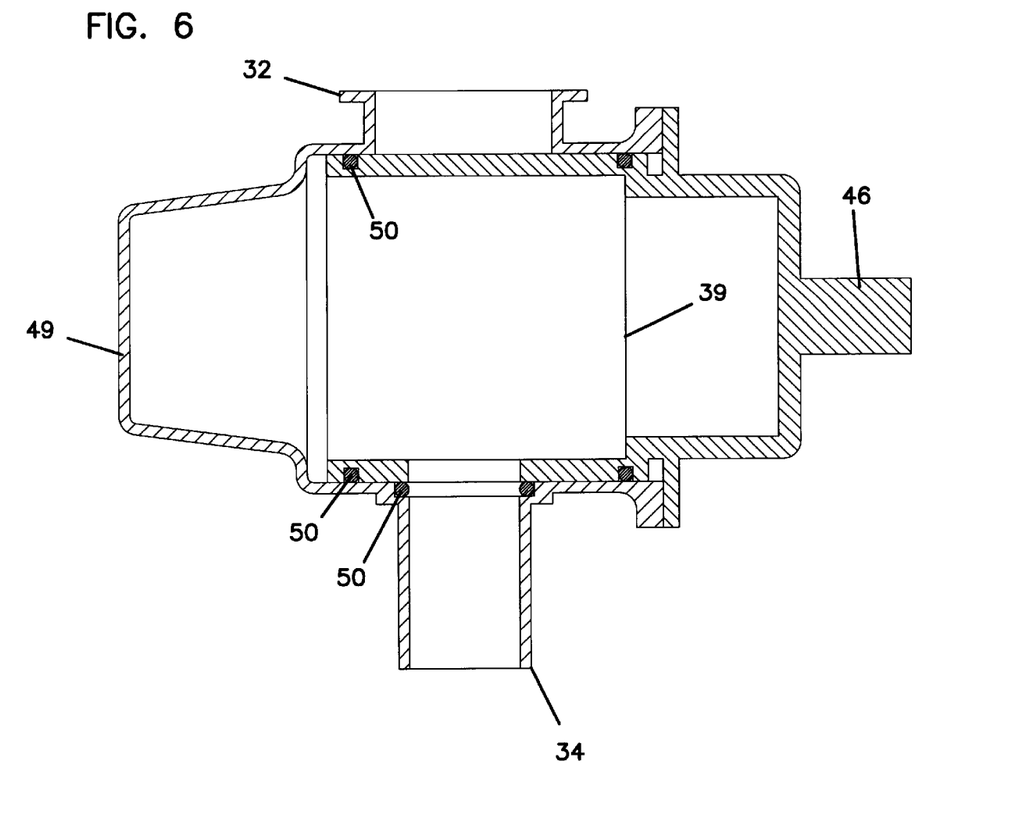
FIG. 6 is a view similar to that of FIG. 4, except that the dispenser is in a dispensing position.

As can be best seen in FIGS. 3, 4 and 6, the rotatable male member 40 is configured and arranged for insertion into and rotation within interior receiving area 24 of stationary female member 20. Rotatable male member 40 is positioned within stationary female member 20 and provides a chamber 42 for measurement of liquid concentrate. Rotatable male member 40 is held tightly in stationary female member 20. Catches 48 can be provided on the rotatable male member 40 for engaging the lip or flange 26 provided on the stationary female member 20. Preferably, the rotatable male member 40 includes a lip or flange 46'to which seats against the lip or flange 26. The catches 48 can be provided for holding the rotatable male member 40 and the stationary female member 20 together. It should be appreciated that the rotatable male member 40 and the stationary female member 20 can be secured together by alternative techniques including other snap engagement techniques, pins, etc. Furthermore, it should be understood that the rotatable male member 40 should be able to rotate within the stationary female member 20. Lubrication, such as silicone grease or oil, can be used to improve ease of rotation.

Rotatable male member 40 includes a wall 41 which forms at least a portion of the chamber 42 for measuring a desired amount of liquid. An aperture or hole 44 is provided within the wall 41 to allow liquid to flow into and out of the chamber 42. The wall 41 includes an interior surface 43 and an exterior surface 45. It is the exterior surface 45 which generally engages the interior surface 25 of the stationary female member 20. The rotatable male member 40 preferably includes a handle 46 for allowing hand rotation of the rotatable male member 40. The handle 46 may be any configuration suitable to withstand the torsional forces needed to rotate rotatable male member 40 within stationary female member 20. The handle 46 preferably is non-symmetrical with a short end 46a and a long end 46b for convenient identification to the user of whether the device is in a fluid receiving or discharging position.

FIG. 3 shows a preferred embodiment of the rotatable male member 40 where the end 47 is open. Accordingly, the chamber 42 is formed by the volume created by the wall 41 and the wall 49. It should be appreciated that the chamber 42 is additionally enclosed by the wall 39. Of course, the end 47 can be closed to provide the chamber having a volume which is formed by the rotatable male member 40.

As shown in FIG. 4, the chamber 42 is enclosed by the wall 41 of the rotatable male member 40 and the wall 49 of the stationary female member 20. The chamber 42 should resist leakage of liquid therefrom. To securely seal any points of potential leakage, a flexible seal is provided, for example by an O-ring. FIGS. 4 and 6 show multiple O-rings 50 positioned at potential points of leakage, in particular where interior receiving area 24 of stationary female member 20 meets exterior wall 41 of rotatable male member 40. O-rings 50 are shown near outlet 34, where rotatable male member 40 terminates within stationary female member 20 near end 47, and where rotatable male member 40 and stationary female member 20 meet near lips 26 and 46. The O-rings 50 are preferably seated within a groove 51 on the stationary female member 20 or within a groove 52 on the rotatable male member 40. FIG. 3 shows grooves 52 in the exterior surface 45 of the rotatable male member 40.

Figure 5:
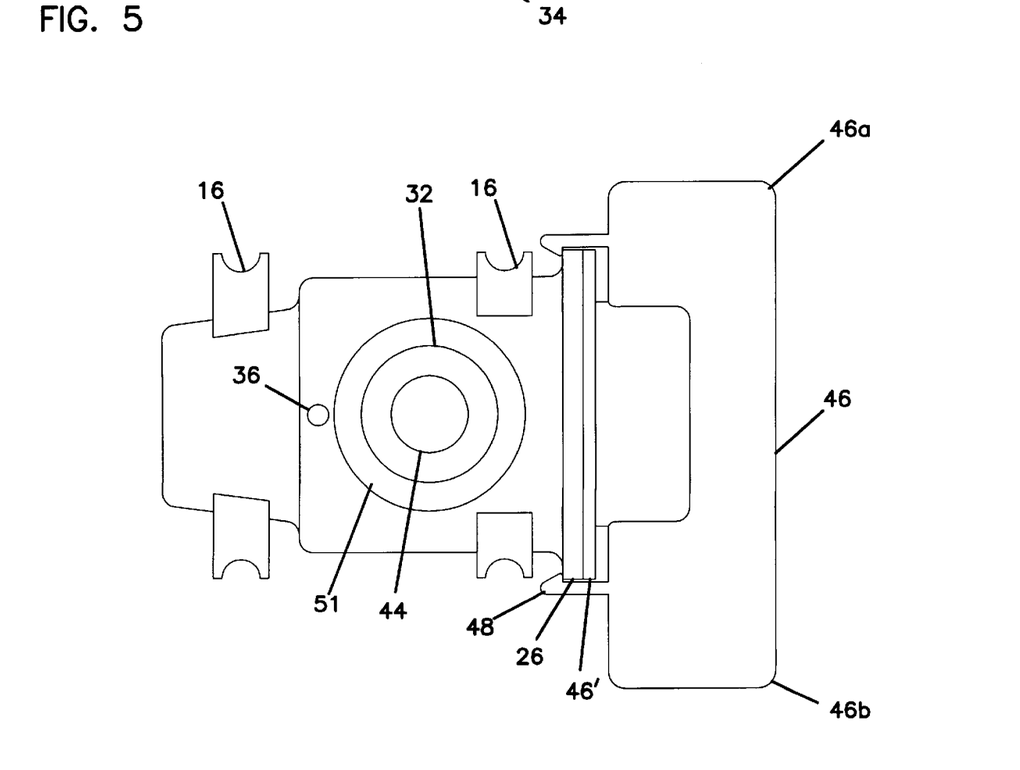
FIG. 5 is a top view of the dispenser shown in FIG. 1 with the dispenser in an accepting position.
Figure 8:
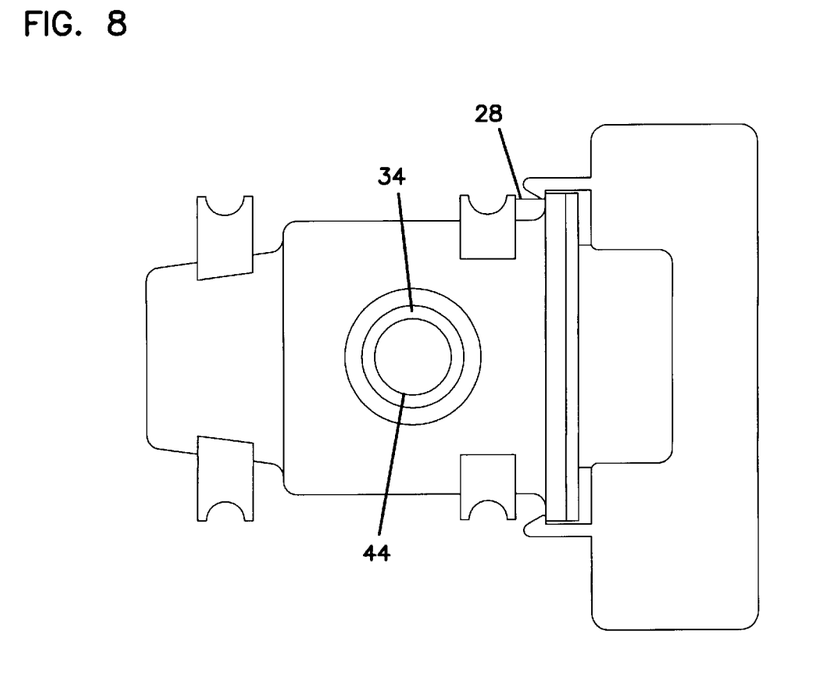
FIG. 8 is a bottom view of the dispenser shown in FIG. 7.

An aperture 44 is provided in rotatable male member 40 which provides access to chamber 42 through inlet 30 and outlet 34. Aperture 44 is preferably sized to correspond to, or be smaller than the cross section of inlet 30 and outlet 34. FIG. 5 shows that aperture 44 is smaller than the diameter of inlet 30 and FIG. 8 shows that aperture 44 is approximately equal to the diameter of outlet 34.

Dispenser 10 is preferably molded from a polymer or copolymer, but could also be made from metal. The two parts, stationary female member 20 and rotatable male member 40, may be made from the same or different materials. In a preferred embodiment, rotatable male member 40 is made from polypropylene and stationary female member 20 is made from high density polyethylene. The wall thickness of either member may be about 0.02 inch to about 0.1 inch, preferably about 0.04 inch, although walls of any thickness may be used. Two walls of 0.04 inch provide an overall wall thickness of 0.08 inch. It is preferred to minimize any sharp corners or edges on both dispenser 10 and device 100; this can be accomplished by providing a radius on internal and external corners.

To accurately measure and dispense a volume of liquid concentrate, the rotatable male member 40 is rotated to a first position so that aperture 44 aligns with inlet 30 in stationary female member 20. FIGS. 4 and 5 show dispenser 10 in a first position, ready for acceptance of liquid concentrate. Aperture 44 is aligned with inlet 30 so that liquid from opening 112 of container 110 enters dispenser 10 by passing through inlet 30 and aperture 44 into chamber 42.

Once chamber 42 is filled with liquid from the container 110, the rotatable male member 40 can be to a second position to dispense the measured liquid from chamber 42 through outlet 34 as shown in FIG. 6. During rotation, chamber 42 is preferably sealed, that is, no liquid should exit or leak from chamber 42 through aperture 44. Similarly, no liquid should seep from opening 112 of container 110. As shown in FIGS. 4 and 6, an O-ring 50 can be placed at the top of outlet 34 to improve sealing between stationary female member 20 and rotatable male member 40. Similarly, O-rings 50 can be positioned at other points where stationary female member 20 contacts edges or ends of rotatable male member 40.

Figure 7:
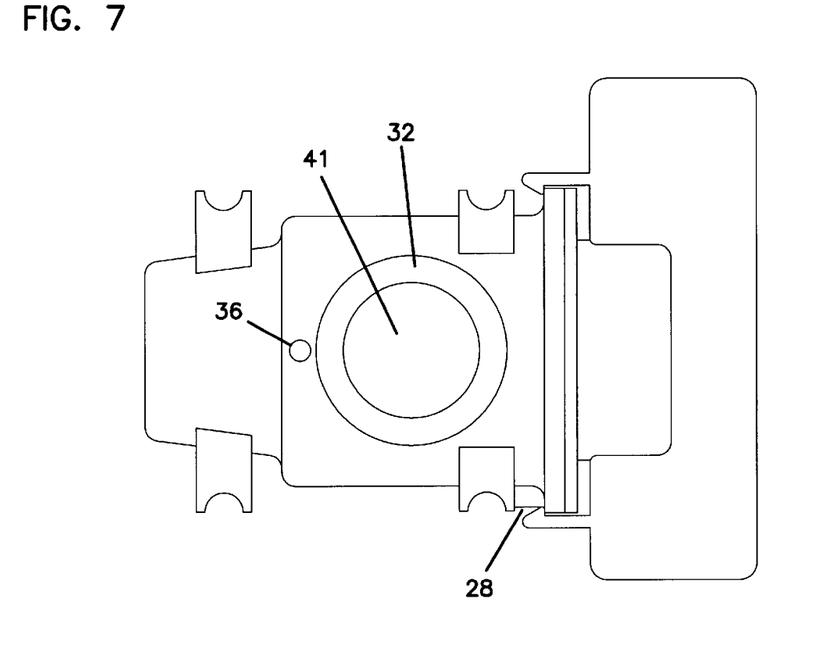
FIG. 7 is a view similar to that of FIG. 5, except that the dispenser is in a dispensing position.

FIGS. 6, 7 and 8 show dispenser 10 in the second, dispensing position. Aperture 44 is no longer aligned with inlet 30 (as can be seen in FIG. 7) but is now aligned with outlet 34 (as can be seen in FIG. 8). Liquid concentrate is drained from chamber 42, through aperture 44 aligned with outlet 34. The liquid can be directly drained into a container where it is mixed with a prescribed amount of diluent, generally tap water.

It is not necessary to provide a vent or other passage to the atmosphere to provide exchange of air in and out of chamber 42 because inlet 30 and outlet 34 are sufficient to provide adequate air/liquid exchange. In some embodiments, it may be desirable to provide a vent, for example, vent 36, as shown in FIGS. 1 and 5–7. One preferred vent system includes holes having about 2 mm in diameter in each of stationary female member 20 and rotatable male member 40, such that when dispenser 10 is in a dispensing position the vent holes will align, but when the dispenser 10 is in an accepting or filling position, the holes will not align. This allows the liquid to more easily flow from the chamber 42.

Once the liquid concentrate has drained, and the rotatable male member 40 is rotated back to the first position so that aperture 44 is again aligned with inlet 30 and chamber 42 is refilled. To return chamber 42 to the first position, rotatable male member 40 can be continued to be rotated in the same direction as from the first position to the second; that is, rotatable male member 40 is rotated a total of 360°. Alternately, rotatable male member 40 can be rotated in the opposite direction, thereby rotating rotatable male member 40 only a total of 180°. If rotatable male member 40 is intended to be rotated only 180° or any other set distance, stop 28 is preferably positioned on stationary female member 20 to limit the rotation of handle 46 and rotatable male member 40. A single stop 28 may be used or a pair of stops 28 approximately 180° opposite each other. Stop 28 should be positioned so that aperture 44 can be aligned with both inlet 30 and outlet 34, although it is understood that in some embodiments the alignment may not be complete and the holes may be slightly offset.

To increase the ease of use of dispenser 10, decals or other labeling or indicia such as embossed lettering can be provided on handle 46 or other part of rotatable male member 40 or stationary female member 20 to indicate whether dispenser 10 is in an accepting or dispensing position.

Figure 9:
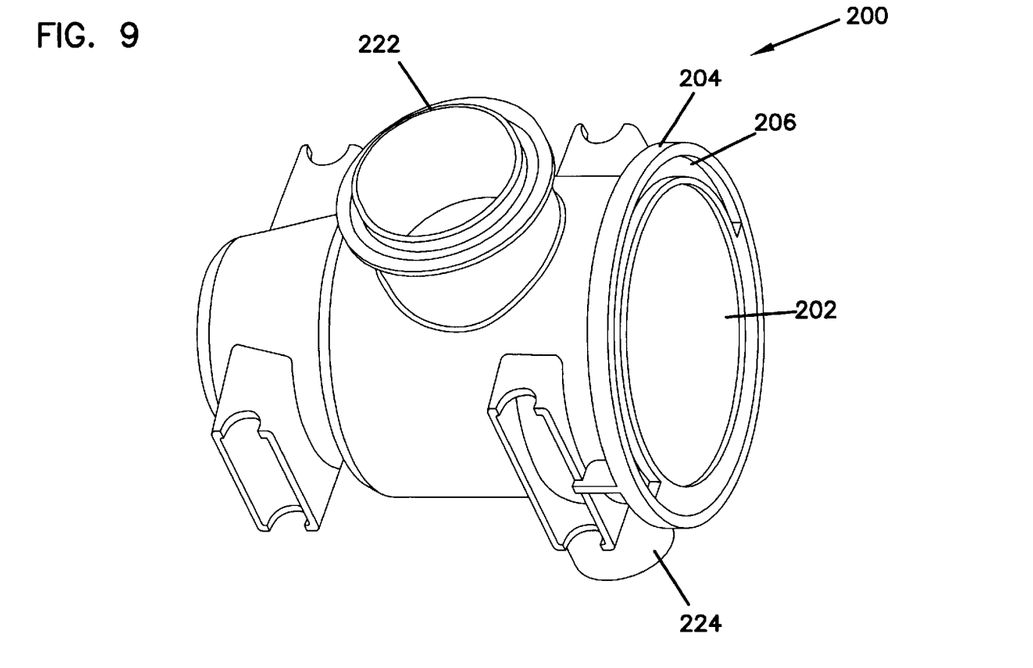
FIG. 9 is a perspective view of an alternative design of the stationary female member of the dispenser of the present invention.
Figure 10:
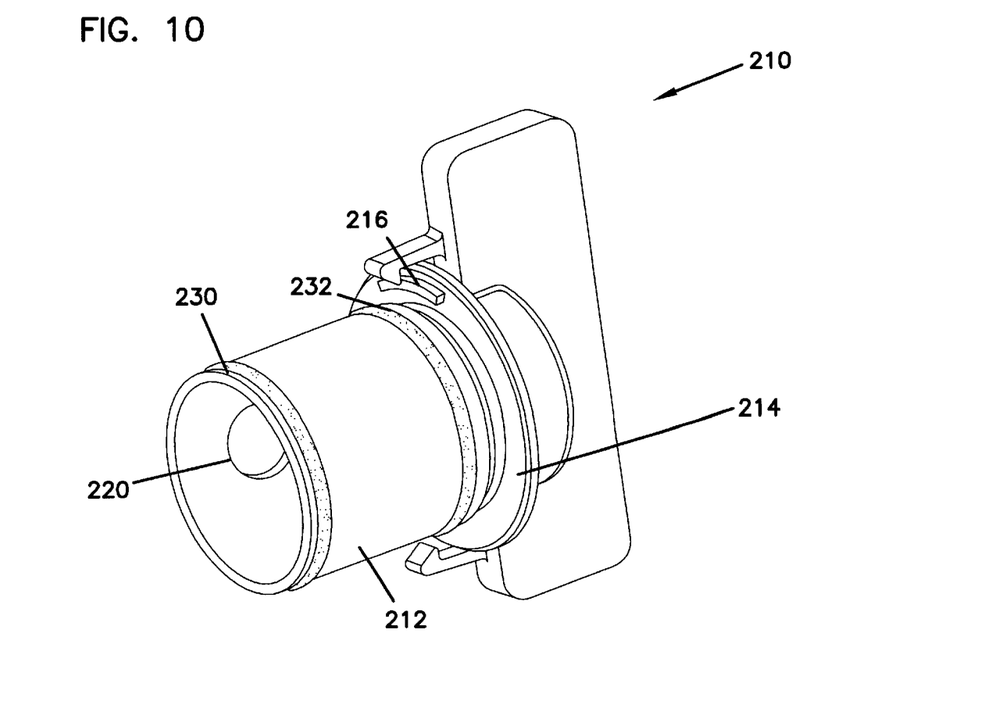
FIG. 10 is a perspective view of an alternative design of the rotatable male member of the dispenser of the present invention.

Now referring to FIGS. 9 and 10, an alternative design of the invention is shown. The stationary female member 200 includes an interior wall 202 and a flange 204 having a groove 206. The rotatable male member 210 includes an extension 212 which generally fits within the wall 202 of the stationary female member 200. The rotatable male member 210 includes a flange 214 having a protrusion 216 which fits within the groove 206. Accordingly, the movement of the rotatable male member 210 within the stationary female member 200 is controlled by the length of the groove 206. Accordingly, by specifying the length of the groove 206, it is possible to more accurately determine the end points of the movement of the rotatable male member 210 within the stationary female member 200. This allows for a more precise alignment of the opening or aperture 220 with the inlet 222 and the outlet 224 of the stationary female member 200.

The extension 212 preferably includes seating areas 230 and 232 for receipt of O-rings. These O-rings would then engage the interior surface 202 of the stationary female member to prevent leakage.

The dispenser 10 is preferably used with agricultural chemicals such as hygiene maintenance solutions for animals. Teat dip and other solutions which are prepared by dilution of a concentrate in water or other aqueous solution are particularly preferred for use with the present inventive dispenser.

A particularly preferred teat dip composition is taught by Richter et al. in U.S. patent application Ser. No. 08/938,064, filed Sep. 26, 1997, assigned to the Assignee of the present invention, and incorporated herein by reference in its entirety. The taught compositions comprise a chlorine dioxide chemical, an acidulant, and an active antimicrobial acid component dissolved or suspended in an aqueous carrier or medium. Preferably the components include a chlorine dioxide generating chemical such as sodium chlorite, an acidulant that can contain a protic acid component and an active antimicrobial acid component, an organic film-forming agent, rheology modifying materials, a hydrotrope, an emollient, a surfactant, a buffer if needed, a colorant and other optional materials. A preferred antimicrobial composition can contain one fugitive biocidal agent, chlorine dioxide, and one or more non-fugitive acid biocidal agents such as a $C_{6-12}$ carboxylic acid, including heptanoic acid, pelargonic acid (nonanoic acid), etc.; an anionic sulfonate, including dodecylbenzenesulfonic acid, and other acidic antimicrobials and mixtures thereof.

In one preferred bovine mastitis treatment having barrier film properties, one part of activator (comprising 0.32% $ClO_2^{-1}$) is diluted into about 36 parts base aqueous formula. See Example I of U.S. Ser. No. 08/938,064. The viscosity of the activator is about 304 cps (measured with a Brookfield Model DV-II Viscometer, spindle No. 1, 20 rpm at 25° C.). In another preferred bovine mastitis treatment, 2.75 parts of sodium chlorite ($ClO_2^{-1}$) activator is diluted into about 100 parts base aqueous formula. See example VIII of U.S. Ser. No. 08/938,064. It is the activator that would be measured and dispensed by the dispenser of the present invention.

While the invention is described in the context of measuring a quantity of liquid concentrate for subsequent dilution, it should be appreciated that the dispenser of the invention can be used to provide a measured amount of nonconcentrated liquid. Furthermore, the measured liquid can be used for purposes other than providing a teat dip composition.

The above explanation and specification describes the elements of the measuring and dispensing device or apparatus of the present invention and its method of use. While a variety of embodiments can be made without departing from the spirit and scope of the invention, the invention resides in the claims hereinafter appended.

What is claimed is:

1. A device for repeated measurement of liquid concentrate from a liquid concentrate storage container, the device comprising:

a stationary female member having an inlet, an outlet, an interior receiving area, and an exterior supporting surface, the inlet being constructed for attachment to an opening in a liquid concentrate storage container;

a rotatable male member provided within the receiving area of the stationary female member, and providing a chamber for measurement of liquid concentrate, wherein:

(i) the rotatable male member is configured and arranged for rotation within the stationary female member between a first position and a second position;

(ii) the chamber comprises a wall for containing liquid concentrate within the chamber and an aperture for allowing liquid concentrate to flow into and out of the chamber;

(iii) the wall and the aperture being configured to allow liquid concentrate to flow into the chamber when the rotatable male member is provided in the first position, and allow liquid concentrate to flow out of the chamber when the rotatable male member is provided in the second position; and a retainer for holding the stationary female member relative to the liquid concentrate storage container, the retainer comprising:

(i) a stationary female member holder for attachment to the exterior supporting surface of the stationary female member; and (ii) a concentrate storage container holder for holding a liquid concentrate storage container.

2. A device according to claim 1, wherein the chamber comprises a volume created by a combination of the rotatable male member and the stationary female member.

3. A device according to claim 1, wherein the rotatable male member further comprises a handle for causing rotation of the rotatable male member between the first position and the second position.

4. A device according to claim 1, wherein the stationary female member includes a rotatable male member engaging surface, and the rotatable male member includes a stationary female member engaging surface, the rotatable male member engaging surface and the stationary female member engaging surface constructed to contain liquid concentrate within the chamber.

5. A device according to claim 4, further comprising an o-ring between the rotatable male member engaging surface and the stationary female member engaging surface.

6. A device according to claim 1, wherein the stationary female member holder is slidably attached to the exterior supporting surface.

7. A device according to claim 1, wherein the exterior support surface of the stationary female member comprises a forward support and a rearward support, the forward support and the rearward support provided for slidably engaging the stationary female member holder.

8. A device according to claim 1, wherein the retainer for holding the stationary female member relative to the liquid concentrate storage container comprises a wire rack.

9. A device according to claim 1, wherein the concentrate storage container holder is constructed for enclosing at least a portion of a liquid concentrate storage container.

10. A device according to claim 1, the rotatable male member comprises a protrusion for controlling movement between the first position and the second position.

11. A device according to claim 10, the stationary female member comprises a groove for receipt of the protrusion for controlling movement between the first position and the second position.

12. A device according to claim 1, wherein the outlet is positioned approximately 180° degrees opposite the inlet on the stationary female member.

13. A device according to claim 1, wherein the inlet of said stationary female member comprises a cap having screw-on threads.

14. A system for repeated measurement of liquid concentrate from a liquid concentrate storage container, the system comprising:

a liquid concentrate storage container having an opening for flow of liquid concentrate therefrom; and a device for repeated measurement of liquid concentrate from the liquid concentrate storage container, the device comprising:

(a) a stationary female member having an inlet, an outlet, an interior receiving area, and an exterior supporting surface, the inlet being constructed for attachment to the opening of the liquid concentrate storage container;

(b) a rotatable male member provided within the receiving area of the stationary female member, and providing a chamber for measurement of liquid concentrate, wherein:

(i) the rotatable male member is configured and arranged for rotation within the stationary female member between a first position and a second position;

(ii) the chamber comprises a wall for containing liquid concentrate within the chamber and an aperture for allowing liquid concentrate to flow into and out of the chamber;

(iii) the wall and the aperture being configured to allow liquid concentrate to flow into the chamber when the rotatable male member is provided in the first position, and allow liquid concentrate to flow out of the chamber when the rotatable male member is provided in the second position; and (c) a retainer for holding the stationary female member relative to the liquid concentrate storage container, the retainer comprising:

(i) a stationary female member holder for attachment to the exterior supporting surface of the stationary female member; and (ii) a concentrate storage container holder for holding a liquid concentrate storage container.

15. A system according to claim 14, wherein the liquid concentrate storage container comprises a plastic bottle.

16. A system according to claim 15, wherein the plastic bottle comprises a one gallon plastic bottle.

17. A system according to claim 15, wherein the concentrate storage container holder is constructed and arranged for extending at least half the height of the liquid concentrate storage container.

18. A system according to claim 14, wherein the inlet of said stationary female member comprises a cap having threads for engaging the opening of said liquid concentrate storage container.

* * * * *